US012770227B2

(12) United States Patent
Wang et al.

(10) Patent No.: US 12,770,227 B2
(45) Date of Patent: Oct. 20, 2026

(54) ENHANCED ARCHITECTURE FOR DEEP LEARNING-BASED VIDEO PROCESSING

(71) Applicant: INTEL CORPORATION, Santa Clara, CA (US)

(72) Inventors: Chen Wang, San Jose, CA (US); Yi-Jen Chiu, San Jose, CA (US); Huan Dou, Beijing (CN); Ying Zhang, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 18/569,528

(22) PCT Filed: Dec. 10, 2021

(86) PCT No.: PCT/CN2021/136957

§ 371 (c)(1),
(2) Date: Dec. 12, 2023

(87) PCT Pub. No.: WO2023/102868

PCT Pub. Date: Jun. 15, 2023

(65) Prior Publication Data

US 2024/0273684 A1 Aug. 15, 2024

(51) Int. Cl.
*G06T 5/60* (2024.01)
*G06T 5/20* (2006.01)

(52) U.S. Cl.
CPC .................. *G06T 5/60* (2024.01); *G06T 5/20* (2013.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 10,225,607 B1 * 3/2019 Bai ........................ H04N 19/59
11,847,847 B2 * 12/2023 Pai ........................ G06V 10/454
(Continued)

FOREIGN PATENT DOCUMENTS

CN 107909556 A 4/2018
CN 110062246 A 7/2019
(Continued)

OTHER PUBLICATIONS

International Search Report and Written Opinion mailed Aug. 25, 2022 in International Application No. PCT/CN2021/136957, 9 pages.

(Continued)

*Primary Examiner* — Jiangeng Sun
(74) *Attorney, Agent, or Firm* — Hanley, Flight & Zimmerman, LLC

(57) ABSTRACT

This disclosure describes systems, methods, and devices related to deep learning-based video processing. A system may include a first neural network associated with generating kernel weights for the DLVP, the first neural network using a first hardware device; and a second neural network associated with filtering image pixels for the DLVP, the second neural network using a second hardware device, wherein the first neural network receives image data and generates the kernel weights based on the image data, and wherein the second neural network receives the image data and the kernel weights, and generates filtered image data based on the image data and the kernel weights.

20 Claims, 7 Drawing Sheets

(56) References Cited

U.S. PATENT DOCUMENTS

| | | | | |
|---|---|---|---|---|
| 2016/0104056 | A1* | 4/2016 | He ........................ | G06V 10/454 382/158 |
| 2019/0297326 | A1 | 9/2019 | Reda et al. | |
| 2019/0355142 | A1* | 11/2019 | Croxford ............. | G06V 10/764 |
| 2020/0125852 | A1* | 4/2020 | Carreira ................... | G06N 3/09 |
| 2020/0226740 | A1* | 7/2020 | Otroshi Shahreza .. | G06N 20/10 |
| 2021/0192337 | A1 | 6/2021 | Loh et al. | |

FOREIGN PATENT DOCUMENTS

| | | | | | |
|---|---|---|---|---|---|
| CN | 111901592 | A | * | 11/2020 | ........... H04N 19/124 |
| CN | 113038126 | A | * | 6/2021 | ............. G06N 3/045 |
| WO | 2021093958 | A1 | | 5/2021 | |

OTHER PUBLICATIONS

International Searching Authority, “International Preliminary Report on Patentability,” issued in connection with International Patent Application No. PCT/CN2021/136957, issued on Jun. 5, 2024, 4 pages.

* cited by examiner

ENHANCED ARCHITECTURE FOR DEEP LEARNING-BASED VIDEO PROCESSING

CROSS-REFERENCE TO RELATED APPLICATION(S)

This application is a U.S. National Stage Application under 35 U.S.C. 371 and claims the priority benefit of International Application No. PCT/CN2021/136957, filed Dec. 10, 2021, the disclosure of which is incorporated herein by reference as if set forth in full.

TECHNICAL FIELD

This disclosure generally relates to systems and methods for video processing and, more particularly, to deep learning-based video processing.

BACKGROUND

Video processing can be inefficient and result in poor image quality. Some video processing techniques are being developed to improve image quality.

DETAILED DESCRIPTION

Figure 1:
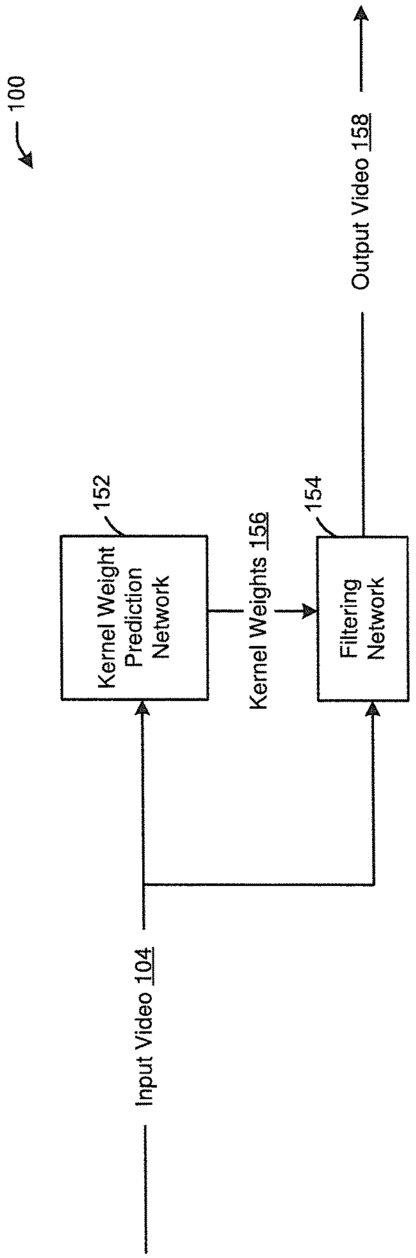
FIG. 1 shows example neural network systems for deep learning-based video processing (DLVP), according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In image processing (e.g., for video), kernel weights may refer to a mask or filter applied to pixels of an image as part of convolution filtering. In convolution filtering, the kernel weights may be applied as the filters to per-pixel data. For example, a convolution layer of a convolutional neural network (CNN) may include filters referred to as kernels. The value of a kernel may represent a weight (e.g., kernel weight, or coefficient) applied to a given pixel. For example, a 3×3 block of pixels has nine pixels, so a corresponding 3×3 kernel has nine weights (e.g., a kernel weight for each pixel in the a 3×3 block of pixels). A convolution filter applied to the block of pixels may include determining the weighted sum of the pixels multiplied by their respective kernel weights. In particular, the filtered value of the central pixel in the 3×3 block of pixels may be generated by determining the weighted sum of the pixels in the 3×3 block multiplied by their respective kernel weights.

Deep learning-based video processing (DLVP) has shown significant quality improvement over some signal processing filters in various domains, such as super-resolution, denoising, sharpening, and the like. In particular, some DLVP techniques use a single neural network deployed on a single hardware device with trained kernel weights to filter each pixel as convolution filters. However, when compared with other deep learning based visual workloads, such as detection, classification, or recognition, DLVP requires much more computation resources and memory bandwidth, particularly for higher resolutions. In particular, per-pixel filtering may apply convolution filtering to an input video frame using convolution weights (e.g., the kernel weights).

The generation of the convolution weights for use by the convolution filters may be content-dependent and may vary from pixel location to pixel location. Because the kernel weight prediction significantly impacts convolution filtering, a neural network used to generate the predicted kernel weights may be complex. In particular, a single hardware device used by a single neural network to perform both the kernel weight predictions and convolution filtering may be complex and resource-intensive. Accordingly, some existing techniques do not predict the kernel weights with neural networks, but rather rely on training data to provide kernel weights to use in the neural network filtering.

There are several reasons for the additional computation resources and memory bandwidth used by DLVP. First, the output of DLVP is a processed video for a human viewer to perceive rather than a semantic label. Therefore, the input video resolution is usually much higher than for other visual workloads. For example, the input resolution of a convolutional neural network (CNN)-based face detector is around 256×256. However, the input resolution of a 1080p to 4K super-resolution is 1920×1080, which would lead to approximately 31 times increase in computation and memory consumption even when the same network topology is applied. Second, DLVP usually requires much higher frame rate. An example framerate of deep learning-based scene classification is only 15 frames per second (fps), while the lowest frame rate of deep learning based super-resolution is 30 fps. Third, the main-stream resolution of the consumer's videos increases rapidly, which leads to increased demand for computation resources beyond the hardware's capability.

To accelerate DLVP, some existing techniques have attempted to simplify the deep learning network topology. Such techniques include reducing the number of layers of a neural network, the number of channels, the number of connections between two consecutive layers, and the bit-precision to represent the weight and activation of the network. Other techniques also try to use low-rank approximation to reduce the complexity of the most computation-intensive layers, (i.e., convolution and fully connected layer). Finally, some networks (e.g., frame-recurrent video super-resolution—FRVSR, enhanced deformable convolutional networks—EDVR) also try to reduce the complexity by seeking temporal correlations via another neural network, which predicts a per-pixel motion vector.

For some existing solutions, although the computation complexity is lowered by reducing the number of layers/channels/bit-precision, the simplified networks are still targeted to generate the output video solely based on the input video (or video-to-video mapping). This type of solution may have multiple drawbacks. First, to achieve noticeable quality improvement over conventional filters, a sufficiently amount of layers/channels/bit-precision may be required to make the neural network "deep" enough. Therefore, it may be difficult to further reduce the computation or memory requirements once such bottleneck is met for a specific input resolution. Second, some of the previous solutions or neural networks are executed on a single computation device (e.g., graphics processing unit—GPU/vision processing unit—VPU/field-programmable gate array—FPGA), which may not take the full advantage of enhanced artificial intelligence (AI) hardware architecture.

Therefore, in the present disclosure, a new network topology is proposed and jointly optimized so that DLVP can be accelerated simultaneously by different hardware devices based on their respectively strength and capability.

In one or more embodiments, DLVP may use enhanced heterogeneous hardware architecture along with a new CNN network topology specific to DLVP to achieve the best visual quality of real-time performance on the limited/constrained computation resources. The enhanced heterogeneous architecture is disclosed herein to accelerate DLVP for faster performance with lower power consumption, which may be achieved by a new neural network topology which decouples DLVP into two parallel workloads: (1) a weight prediction network, and (2) a filtering network. The weight prediction network may predict the pre-pixel kernel weights (e.g., coefficients) based on the input video, while the filtering network may apply a filtering process based on the weights generated by the weight prediction network. Both networks may be based on auto-encoder structures, however, their computation complexities may differ to cater for different artificial intelligence (AI) hardware accelerators (e.g., GPU and fixed function/FPGA). By executing the two networks in parallel on different hardware accelerators, significant performance improvement with little quality drop can be realized. In particular, the enhanced DLVP may support higher input resolution (e.g., 1080p or 4K) with faster performance (i.e., 60 fps), and lower power consumption in the future generations.

In one or more embodiments, the DLVP architecture may be enhanced by decoupling the weight prediction and filtering functions into two separate, parallel workloads. In this manner, the enhanced DLVP architecture differs from other DLVP techniques, such as enhanced deep residual networks (EDSR), EDVR, and FRVSR, in which a single neural network may be used to perform both tasks (e.g., not in parallel).

There are multiple reasons for decoupling the weight prediction and filtering networks into separate neural networks. Most of the video processing workloads consist of two consecutive operations in nature: kernel weights prediction and per-pixel filtering. For the kernel weight prediction, the main purpose is to adaptively generate the most suitable coefficients of the convolution filters (e.g., the kernel weights) based on the characteristic of the video content itself. Such coefficient generation is content-dependent, and may vary from location to location within an image. For example, some part of the video content may be blurred, therefore, sharpness filter coefficients should be generated accordingly. However, the other part of the video content may suffer from sensor noise, which requires generating smoothing filter coefficients for noise reduction. For the per-pixel filtering, the focus is to apply convolution filtering to the input video frame by using the generated coefficients. The kernel weight prediction has significant quality impact on the final output, therefore, it requires a complicated neural network with sufficient channel numbers and deep enough layers to conduct in-depth video content analysis. On the contrary, pre-pixel filtering is of low computation complexity and can be implemented by a small neural network, which can be well accelerated by the hardware accelerators (e.g., media fixed function) with limited computation capability and memory bandwidth. Without the decoupling described herein, a single neural network designed to perform both operations on a single hardware device may result in an overbuilt network requiring significant computation resources and memory bandwidth, especially when the input video resolution is high (e.g., 1080p or 4K).

Another advantage of the proposed DLVP topology herein is that weight prediction network and filtering network can run in parallel on different hardware devices. In particular, when the filtering network is working on a frame t, the weight prediction network may be working simultaneously on the next frame (i.e., frame t+1). When compared with the weight prediction network, the filtering network may have much less computation complexity and memory bandwidth requirement, so its running time can be hidden by that of the weight prediction network.

In one or more embodiments, a 1080p or 4K video clip can be used to identify the above-described enhancements. For example, when DLVP is applied to the given video clip with the performance no less than 30 fps, a processing system may monitor the utilization of different hardware AI accelerators (e.g., CPU, GPU or neural processing unit—NPU, etc.). If the utilization of any two devices is very high, such may be an indication of the use of the enhancements described herein.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 shows example neural network systems for DLVP, according to some example embodiments of the present disclosure.

Referring to FIG. 1, a neural network system 100 may receive input video 104 (e.g., having video frames—images. The neural network system 150 may include a kernel weight prediction neural network 152 and a filtering neural network 154, which may operate in parallel. As shown, the input video 104 may be input to both the kernel weight prediction neural network 152 and to the filtering neural network 154. The kernel weight prediction neural network 152 may generate kernel weights 156 for the filtering neural network 154 to apply to the input video 104, resulting in generation of output video 158.

In one or more embodiments, to generate the output video 158, a value of any pixel of the input video 104 may be generated by the filtering neural network 154 by determining a sum of weighted pixel values for a pixel block of the pixel. For example, using a 3×3 pixel block with pixel values $P_1$-$P_9$ (e.g., the pixel values indicative of pixel brightness and/or other pixel features), the kernel weights 156 may include a 3×3 array of weight values for each pixel: $W_1$-$W_9$. So, the value of any pixel $P_i$ may be represented by the sum of $P_1W_1+P_2W_2+P_3W_3+P_4W_4+P_5W_5+P_6W_6+P_7W_7+P_8W_8+P_9W_9$, where $P_i$ may be a central pixel of the 3×3 pixel block. Such convolution may be applied to each pixel of an image to result in a filtered pixel value used for the output video 158. Other types of convolution may be used to convolve the pixel values with a filter (e.g., the kernel weights 156).

In one or more embodiments, the kernel weight prediction neural network 152 may predict the kernel weights 156 based on the input video 104, and the filtering neural network 154 may apply filtering based on the kernel weights 156. The kernel weight prediction neural network 152 and the filtering neural network 154 may use autoencoder structures, but their computation complexities are dramatically different to cater for different artificial intelligence (AI) hardware accelerators (e.g., GPU and fixed function/FPGA). By running the two neural networks in parallel on different hardware accelerators, significant performance improvement with little quality drop can be realized.

In one or more embodiments, most of the video processing workloads include two consecutive operations in nature: kernel weights prediction and per-pixel filtering. For the kernel weight prediction, the main purpose is to adaptively generate the most suitable coefficients of the convolution filters (or the kernel weights 156) based on the characteristic of the input video 104 itself. The coefficient generation may be content dependent and may vary from location to location. For example, some part of the input video 104 may be blurred, therefore, sharpness filter coefficients should be generated accordingly. However, the other part of the input video 104 may be suffered from sensor noise, which requires generating smoothing filter coefficients for noise reduction. For the per-pixel filtering (e.g., the filtering neural network 154), the focus is to simply apply convolution filtering to frames of the input video 104 by using the generated coefficients (e.g., the kernel weights 156). The kernel weight prediction has significant quality impact on the final output, therefore, it may require a complicated neural network with sufficient channel numbers and deep enough layers to conduct in-depth video content analysis. In contrast, pre-pixel filtering is of low computation complexity and can be implemented by a small neural network (e.g., the filtering neural network 154), which can be well accelerated by hardware accelerators (e.g., media fixed function) with limited computation capability and memory bandwidth. Without such decoupling of the neural networks, a single neural network may be designed to perform both operations on a single hardware device, which would inevitably lead to an overbuilt network, which requires significant computation resources and memory bandwidth, especially when the input video 104 resolution is high (e.g., 1080p or 4K).

In one or more embodiments, another advantage of the proposed topology in FIG. 1 is that kernel weight prediction neural network 152 and the filtering neural network 154 can run in parallel on different hardware devices. To be more specific, when the filtering neural network 154 is working on a frame t of the input video 104, the kernel weight prediction neural network 152 will be working simultaneously on the next frame (i.e., frame t+1). When compared with the kernel weight prediction neural network 152, the filtering neural network 154 may have less computation complexity and memory bandwidth requirement. Thus, the running time of the filtering neural network 154 can be hidden by that of the kernel weight prediction neural network 152.

In one or more embodiments, the kernel weight prediction neural network 152 and the filtering neural network 154 may be used to analyze the input video 104 to determine predicted characteristics (e.g., based on previously analyzed image data). The predicted characteristics may affect the selection of video coding parameters (e.g., as explained below with respect to FIG. 5).

Figure 2:
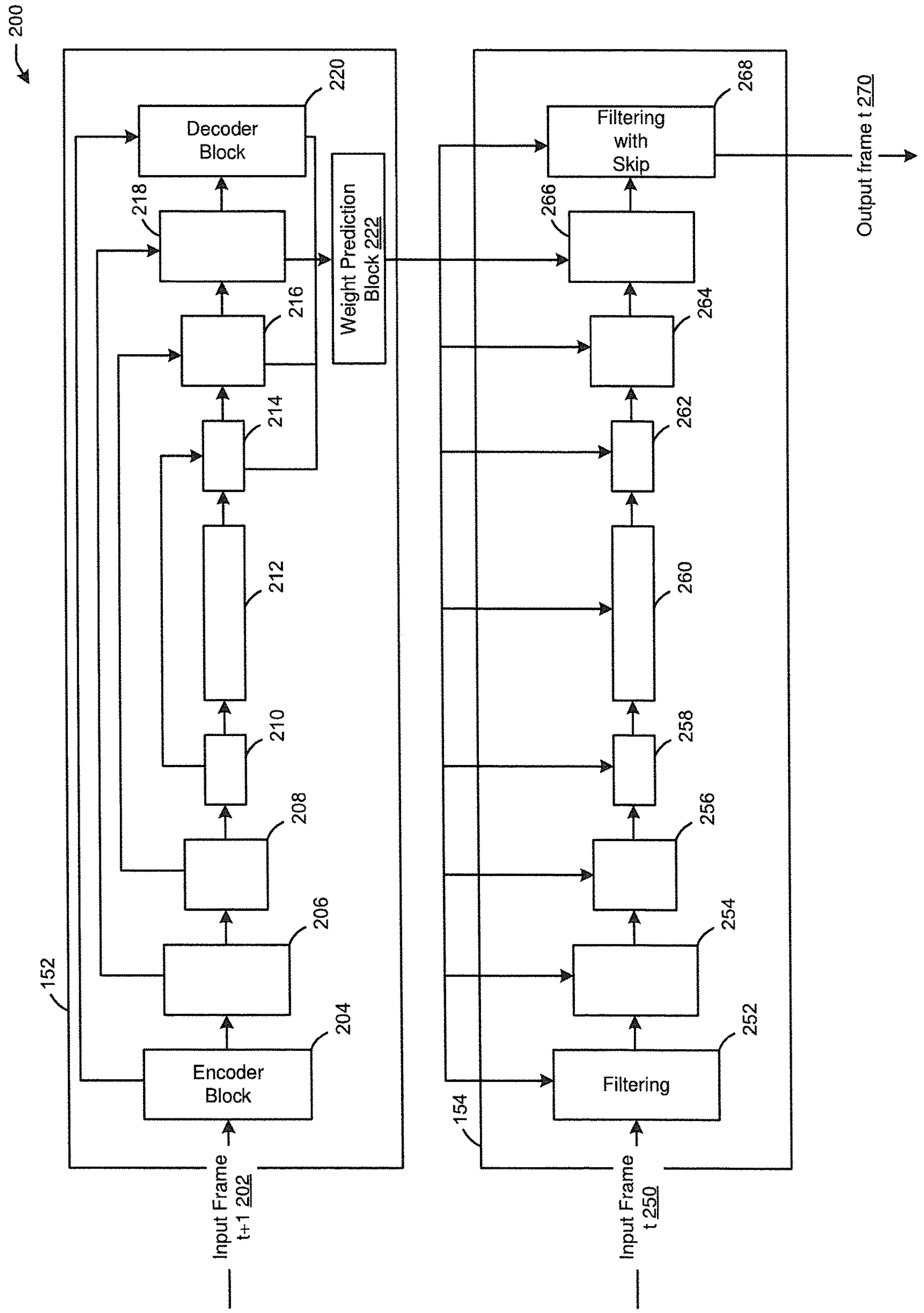
FIG. 2 shows a network topology of the kernel weight prediction neural network 152 and the filtering neural network of FIG. 1, according to some example embodiments of the present disclosure.

FIG. 2 shows a network topology 200 of the kernel weight prediction neural network 152 and the filtering neural network 154 of FIG. 1, according to some example embodiments of the present disclosure.

Referring to FIG. 2, and input frame t+1 202 (e.g., of the input video 104 of FIG. 1) may be input to an encoder block 204 (e.g., having 32 channels) of the kernel weight prediction neural network 152, which may downscale the input frame t+1 202. The downscaled input frame t+1 202 may be downscaled again by an encoder block 206 (e.g., having 64 channels), again by an encoder block 208 (e.g., having 96 channels), again by an encoder block 210 (e.g., having 128 channels), and again by an encoder block 212 (e.g., having 160 channels). A decoder block 214 (e.g., having 128 channels) may upscale the input frame t+1 202. A decoder block 216 (e.g., having 96 channels) may upscale the input frame t+1 202. A decoder block 218 (e.g., having 64 channels) may upscale the input frame t+1 202. A decoder block 220 (e.g., having 32 channels) may upscale the input frame t+1 202. Encoder and decoder blocks may be skipped. For example, the input frame t+1 202 may skip from the encoder block 204 to the decoder block 220, from the encoder block 206 to the decoder block 218, from the encoder block 208 to the decoder block 216, or from the encoder block 210 to the decoder block 214. The upscaled input frame t+1 202 from the respective decoder blocks may be input to a weight prediction block 222 (e.g., having six channels) to generate the kernel weights 156 of FIG. 1.

Still referring to FIG. 2, the kernel weights generated by the weight prediction block 222 may be input to the filtering neural network 154 along with input frame t 250 (e.g., of the input video 104 of FIG. 1). In particular, the kernel weights may be input to a filtering block 252 (e.g., having three channels), which may filter pixels of the input frame t 250 using the kernel weights. A filtering block 254 (e.g., having three channels) may filter pixels of the input frame t 250 using the kernel weights. A filtering block 256 (e.g., having three channels) may filter pixels of the input frame t 250 using the kernel weights. A filtering block 258 (e.g., having three channels) may filter pixels of the input frame t 250 using the kernel weights. A filtering block 260 (e.g., having three channels) may filter pixels of the input frame t 250 using the kernel weights. A filtering block 262 with skip (e.g., having three channels) may filter pixels of the input frame t 250 using the kernel weights. A filtering block 264 with skip (e.g., having three channels) may filter pixels of the input frame t 250 using the kernel weights. A filtering block 266 with skip (e.g., having three channels) may filter pixels of the input frame t 250 using the kernel weights. A filtering block 268 with skip (e.g., having three channels) may filter pixels of the input frame t 250 using the kernel weights. The blocks of the kernel weight prediction neural network 152 and the filtering neural network 154 are shown in further detail with regard to FIGS. 3A-3E.

In one or more embodiments, the channels of the layers may refer to feature maps or kernels. For example, the filtering blocks with three channels in FIG. 2 may refer to RBG channels (e.g., an R channel, a G channel, and a B channel for red, blue, and green). Any channel may describe features of a previous layer. In this manner, the layers may represent filters, and the channels of the layers—defining the structure of the layers—may represent kernels. A channel or kernel may refer to a two-dimensional array of weights, and the layers or filters may refer to a three-dimensional array of multiple channels or kernels.

In one or more embodiments, the encoder blocks and decoder blocks of FIG. 2 may use autoencoder structures (e.g., convolutional autoencoders).

Figure 3A:
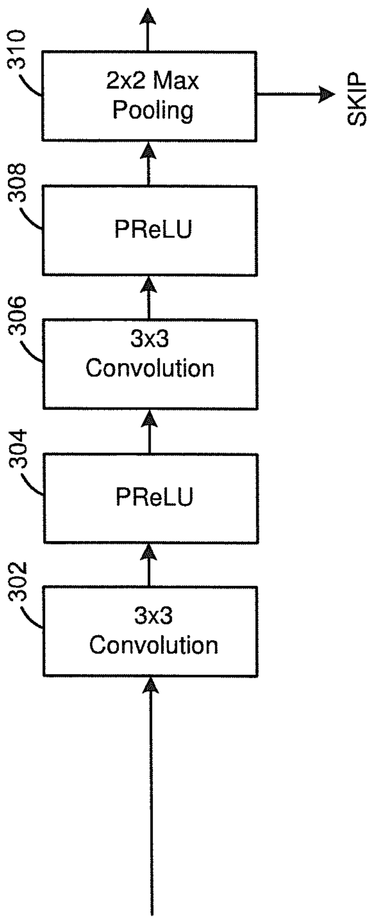
FIG. 3A shows components of the encoder blocks of FIG. 2, according to some example embodiments of the present disclosure.

FIG. 3A shows components of the encoder blocks of FIG. 2, according to some example embodiments of the present disclosure.

Referring to FIG. 3A, any of the encoder blocks 204-212 of FIG. 2 may include the components shown, including a 3×3 convolution layer 302 (e.g., a 3×3 template for a respective pixel), a parametric rectified linear unit (PRELU) layer 304 (e.g., an activation function for which a value is multiplied by an array when the value is less than zero, and is left as the value when greater than or equal to zero), a 3×3 convolution layer 306, a PReLU layer 308, and a 2×2 maximum pooling layer 310 (e.g., that selects a maximum—most prominent—element from a region of a feature array). Pooling may include sliding a filter (e.g., 2×2 filter) over channels of a feature array and summarizing the features in the region to which the filter is applied by selecting a maximum value, minimum value, average value, etc. The components of the encoder blocks may extract features of input pixels. The 2×2 maximum pooling layer 310 may be skipped for any encoder block (e.g., when the encoder block 204 is skipped in FIG. 2, the skipping may refer to the 2×2 maximum pooling layer 310 of the encoder block 204).

Figure 3B:
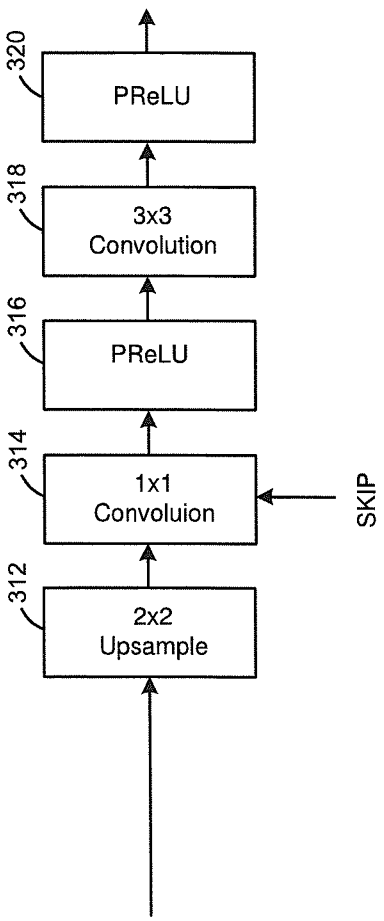
FIG. 3B shows components of the encoder blocks of FIG. 2, according to some example embodiments of the present disclosure.

FIG. 3B shows components of the encoder blocks of FIG. 2, according to some example embodiments of the present disclosure.

Referring to FIG. 3B, any of the decoder blocks 214-220 of FIG. 2 may include the components shown, including a 2×2 upsample layer 312 (e.g., to increase the sampling rate by inserting values of zero between the input values), a 1×1 convolution layer 314, a PReLU layer 316, a 3×3 convolution layer 318, and a PRELU layer 320. When a skip occurs in FIG. 2 (e.g., from the encoder block 204 to the decoder block 220), the skip may refer to skipping the 2×2 upsample layer 312 to input the downscaled pixel into the 1×1 convolution layer 314.

Referring to FIGS. 3A and 3B, the convolution layers 302, 306, 314, and 318 may use convolution weights, which may be different for any respective convolution layer. For example, a 3×3 convolution may use a 3×3 array of convolution weights, a 1×1 convolution layer may use a single convolution weight, and so on. The convolution weights may be adjusted by the kernel weight prediction neural network 152. For example, the convolution weights may be different based on various image features, such as blur, brightness, sharpness, etc. Some portions (e.g., locations) of an image may be blurred and/or may experience sensor noise, so the convolution weights generated by the convolution layers may be generated accordingly for use by the filtering neural network 154.

Figure 3C:
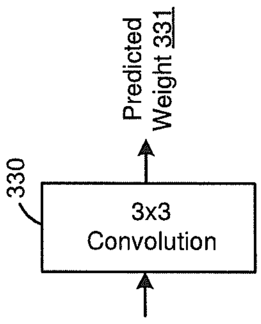
FIG. 3C shows components of the weight prediction block of FIG. 2, according to some example embodiments of the present disclosure.

FIG. 3C shows components of the weight prediction block 222 of FIG. 2, according to some example embodiments of the present disclosure.

Referring to FIG. 3C, the weight prediction block 222 may include a 3×3 convolution layer 330 to generate a predicted weight 331.

Figure 3D:
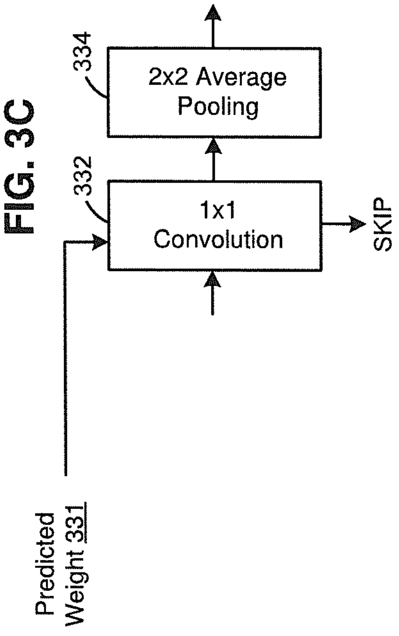
FIG. 3D shows components of the filtering blocks of FIG. 2, according to some example embodiments of the present disclosure.

FIG. 3D shows components of the filtering blocks 252-260 of FIG. 2, according to some example embodiments of the present disclosure.

Referring to FIG. 3D, the predicted weight 331 may be input to a 1×1 convolution layer 332 of a filtering block, which may be skipped. When not skipped, the output of the 1×1 convolution layer 332 may be input to a 2×2 average pooling layer 334. Pooling may include sliding a filter (e.g., 2×2 filter) over channels of a feature array and summarizing the features in the region to which the filter is applied by selecting a maximum value, minimum value, average value, etc. The average pooling layer 334 may slide a 2×2 filter over a feature array and select the average value.

Figure 3E:
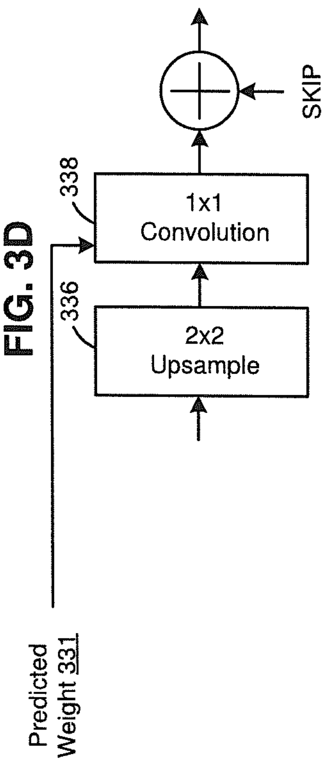
FIG. 3E shows components of the filtering blocks with skip of FIG. 2, according to some example embodiments of the present disclosure.

FIG. 3E shows components of the filtering blocks 262-268 with skip of FIG. 2, according to some example embodiments of the present disclosure.

Referring to FIG. 3E, the video data may be input to a 2×2 upsample layer 336 of a filtering block with skip, and the output may be input to a 1×1 convolution layer 338, which may receive the predicted weight 331 as an input. When skipped, the 2×2 upsample layer 336 and the 1×1 convolution layer 338 may be skipped for a respective filter block with skip.

Referring to FIGS. 3A-3E, each convolution layer may implement a convolution weight (e.g., kernel weight or coefficient). The output of the convolution layers may be feature metrics that may indicate the likelihood that specific features are in a corresponding frame. The kernel weight prediction neural network 152 may adjust the convolution weights applied at any layer (e.g., the convolution layers of FIGS. 3A and 3B). Accordingly, the predicted kernel weights (e.g., the predicted weight 331) may be used by the convolution layers of the filtering neural network 154 (e.g., as shown in FIGS. 3D and 3E) as the convolution weights. The filtering neural network 154 may receive an image t (e.g., the input frame t 250) and the predicted kernel weights generated by the kernel weight prediction neural network 152 to use as convolution weights in the filtering layers of the filtering neural network 154. Because the kernel weight prediction neural network 152 uses the t+1 frame (e.g., the input frame t+1 202, representing a frame subsequent to the input frame t 250 in a series of video frames) to generate the convolution weights for the filtering neural network 154 to use in filtering layer convolutions, the kernel weight prediction neural network 152 and the filtering neural network 154 may operate in parallel (e.g., simultaneously on separate hardware), as the kernel weight prediction neural network 152 operates on a next frame relative to the frame being filtered by the filtering neural network 154 at any given time. The input to a filtering layer may be a pixel (e.g., per-pixel filtering), so the output may be a filtered pixel.

Referring to FIGS. 2-3E, the computation and memory bandwidth requirements of the kernel weight prediction neural network 152 and the filtering neural network 154 are different, as shown in Table 1 below.

TABLE 1

Computation and memory bandwidth requirements of different network topologies for 1080p input:

| | Weight prediction network | Filtering network | EDSR3_64 |
|---|---|---|---|
| Number of | 0.297 | 99.3 | 1.08 |

TABLE 1-continued

Computation and memory bandwidth requirements of different network topologies for 1080p input:

| | Weight prediction network | Filtering network | EDSR3_64 |
|---|---|---|---|
| Operations | TFLOPS | MFLOPS | TFLOPS |
| Memory Access | 1.48 GBytes | 85.9 Mbytes | 3.95 GBytes |
| Projected Performance (DG2 512EUs @ 1.5 GHz) | 160 fps | 3660 fps | 61.2 fps |

For the kernel weight prediction neural network 152, due to the large number of floating-point operations and significant memory traffic, it may be more suitable to be accelerated by high-performance computing devices, such as a graphics processing unit (GPU). On the contrary, the computation complexity of the filtering neural network 154 is much lower. Therefore, the filtering neural network 154 can be accelerated by hardware with limited computation resources and memory bandwidth, such as the media fixed functions in a video enhancement box (VEBOX) that may include hardware for video processing operations.

Another interesting observation is that for the conventional convolution neural network (CNN) network topology (i.e., EDSR3 with 64 channels), as shown in Table 2 below, to achieve the comparable visual quality in terms of peak signal-to-noise ratio (PSNR), structural similarity index (SSIM), and video multimethod assessment fusion (VMAF), the computation complexity and memory bandwidth are approximately 3.6 and 2.6 times larger than those of the proposed network, respectively. This would eventually lead to 2.6 times performance drop for 1080p input. This further justifies that by decoupling DLVP into two parallel workloads could effectively prevent the over-design of the conventional deep learning-based approaches. Consequently, it will help to significantly improve the performance without any visible quality difference.

TABLE 2

Difference in the objective visual quality metrics between conventional DLSR method EDSR3_64 and the proposed network over the evaluation dataset containing 6000 videos:

| EDSR3_64 | | | Proposed Network | | | Difference between EDSR3_64 and Proposed Network | | |
|---|---|---|---|---|---|---|---|---|
| PSNR | SSIM | VMAF | PSNR | SSIM | VMAF | PSNR | SSIM | VMAF |
| 33.23 | 0.9942 | 87.18 | 33.12 | 0.9930 | 83.96 | 0.11 | 0.0012 | 3.22 |

Figure 4:
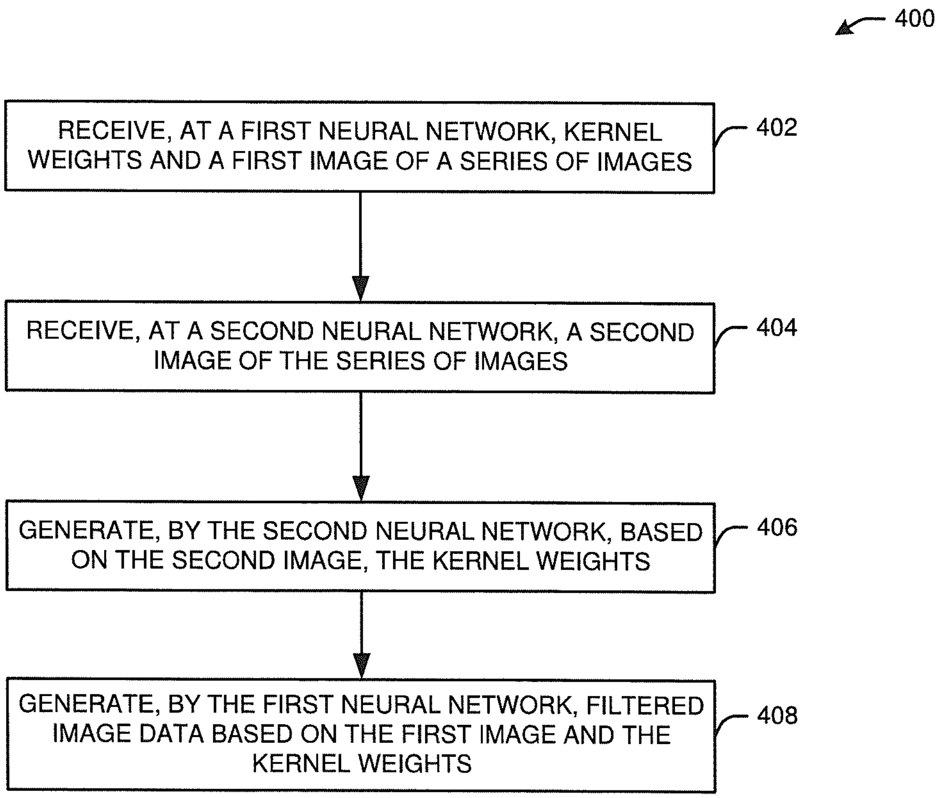
FIG. 4 illustrates a flow diagram of an illustrative process for deep learning-based video processing, in accordance with one or more example embodiments of the present disclosure.

FIG. 4 illustrates a flow diagram of illustrative process 400 for DLVP, in accordance with one or more example embodiments of the present disclosure.

At block 402, a device (e.g., system, such as the neural network system 100 of FIG. 1, the devices 502 of FIG. 5, the system 600 of FIG. 6) may receive, at a first neural network (e.g., the filtering neural network 154 of FIG. 1), a first image (e.g., the input frame t 250 of FIG. 2) of a series of images (e.g., the input video 104 of FIG. 1) and kernel weights (e.g., the kernel weights 156 of FIG. 1). The first neural network may operate using a first hardware device (e.g., one of the AI accelerator(s) 667 of FIG. 6) and may operate in parallel with a second neural network (e.g., the kernel weight prediction neural network 152 of FIG. 1). In this manner, the second neural network may operate using a second hardware device (e.g., a second one of the AI accelerator(s) 667 of FIG. 6). The kernel weights may be generated by the second neural network using a second, subsequent image (e.g., the input frame t+1 202 of FIG. 2) in the series of images.

At block 404, the device may receive, at the second neural network, the second image. The second image may occur after the first image in the series of images so that the first neural network is able to filter pixels of the first image based on the parallel generation of kernel weights by the second neural network.

At block 406, the device may generate, using the second neural network, the kernel weights for the first neural network to use in per-pixel convolution filtering. The second neural network may include encoders and decoders (e.g., representing an autoencoder structure as shown in FIG. 2). The encoders may include convolution layers, PRELU layers, and a pooling layer (e.g., FIG. 3A). The decoders may include convolution layers, PRELU layers, and an upsample layer (e.g., FIG. 3B). The kernel weights generated using the second image may be used as convolution weights for the convolution filtering of the first image by the first neural network layer. The second neural network may include an additional convolution layer as part of a weight predictor (e.g., FIG. 3C) to generate the predicted kernel weights.

At block 408, the device may generate, using the first neural network, filtered image data for the first image, using the kernel weights generated from the second image by the second neural network. The first neural network may include convolution layers, a pooling layer, and an upsample layer (e.g., FIGS. 3D and 3E), and some of the filtering may be skipped. The convolution weights for the filtering layers may be the predicted kernel weights generated by the second neural network. The filtered image data may be output data presentable to a user.

Figure 5:
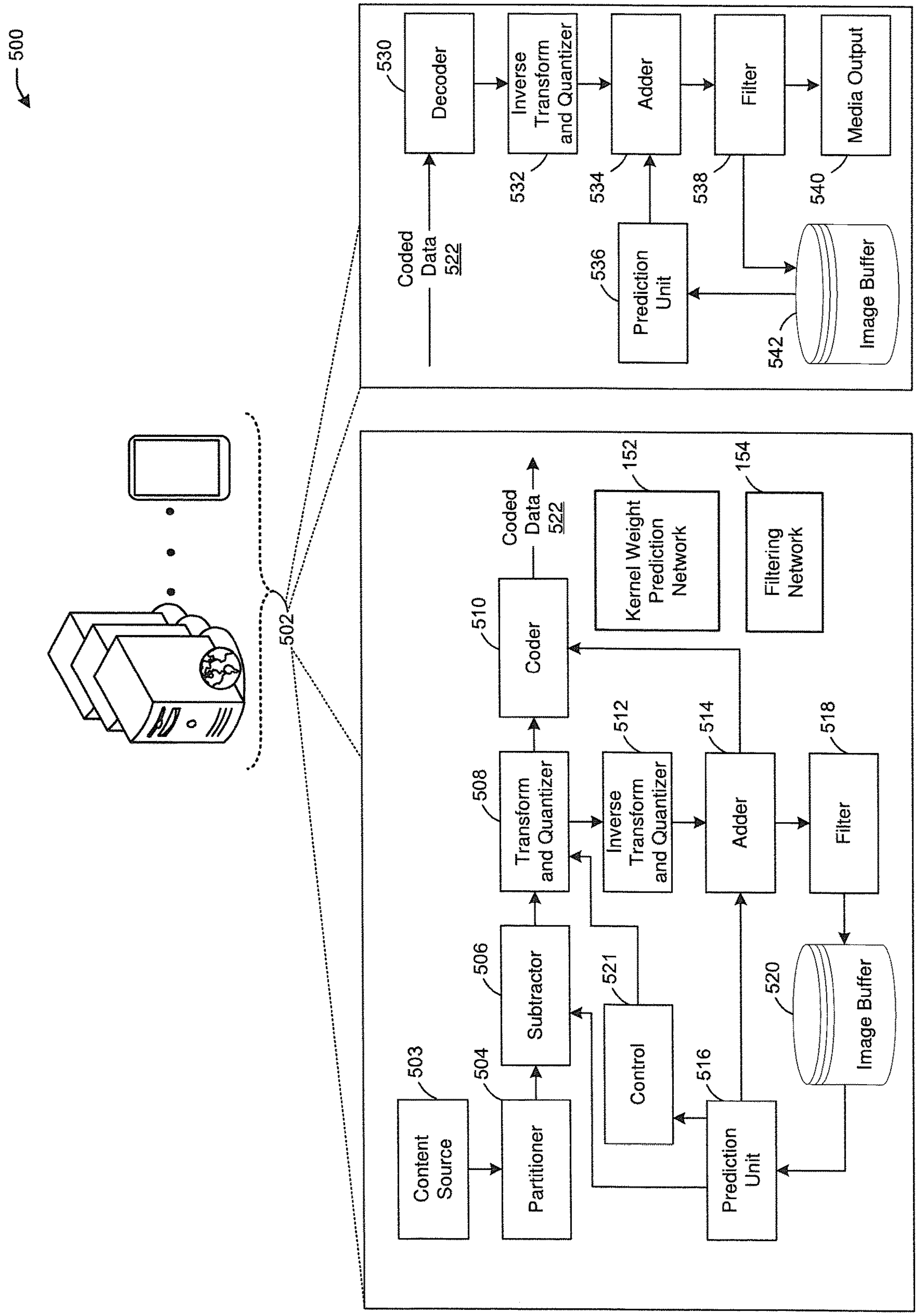
FIG. 5 is an example system illustrating components of encoding and decoding devices, according to some example embodiments of the present disclosure.

FIG. 5 is an example system 500 illustrating components of encoding and decoding devices, according to some example embodiments of the present disclosure.

Referring to FIG. 5, the system 500 may include devices 502 having encoder and/or decoder components. As shown, the devices 502 may include a content source 503 that provides video and/or audio content (e.g., a camera or other image capture device, stored images/video, etc.). The content source 503 may provide media (e.g., video and/or audio) to a partitioner 504, which may prepare frames of the content for encoding. A subtractor 506 may generate a residual as explained further herein. A transform and quantizer 508 may generate and quantize transform units to facilitate encoding by a coder 510 (e.g., entropy coder). Transform and quantized data may be inversely transformed and inversely quantized by an inverse transform and quantizer 512. An adder 514 may compare the inversely transformed and inversely quantized data to a prediction block generated by a prediction unit 516, resulting in reconstructed frames. A filter 518 (e.g., in-loop filter for resizing/cropping, color conversion, de-interlacing, composition/blending, etc.) may revise the reconstructed frames from the adder 514, and may store the reconstructed frames in an image buffer 520 for use by the prediction unit 516. A control 521 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 516. Using the encoding aspects, the transform and quantizer 508 may generate and quantize transform units to facilitate encoding by the coder 510, which may generate coded data 522 that may be transmitted (e.g., an encoded bitstream).

Still referring to FIG. 5, the devices 502 may receive coded data (e.g., the coded data 522) in a bitstream, and a decoder 530 may decode the coded data, extracting quantized residual coefficients and context data. An inverse transform and quantizer 532 may reconstruct pixel data based on the quantized residual coefficients and context data. An adder 534 may add the residual pixel data to a predicted block generated by a prediction unit 536. A filter 538 may filter the resulting data from the adder 534. The filtered data may be output by a media output 540, and also may be stored as reconstructed frames in an image buffer 542 for use by the prediction unit 536.

Referring to FIG. 5, the system 500 performs the methods of intra prediction disclosed herein, and is arranged to perform at least one or more of the implementations described herein including intra block copying. In various implementations, the system 500 may be configured to undertake video coding and/or implement video codecs according to one or more standards. Further, in various forms, video coding system 500 may be implemented as part of an image processor, video processor, and/or media processor and undertakes inter-prediction, intra-prediction, predictive coding, and residual prediction. In various implementations, system 500 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 500 and/or other systems, schemes or processes may be described herein, the present disclosure is not necessarily always limited to any particular video coding standard or specification or extensions thereof except for IBC prediction mode operations where mentioned herein.

Still referring to FIG. 5, the system 500 may include the kernel weight prediction neural network 152 and the filtering neural network 154 of FIG. 1. Based on the characteristics extracted using the kernel weight prediction neural network 152 and the filtering neural network 154, the control 521 may adjust encoding parameters.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 500 may be an encoder where current video information in the form of data related to a sequence of video frames may be received to be compressed. By one form, a video sequence (e.g., from the content source 503) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 504 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 500 may receive an input frame from the content source 503. The input frames may be frames sufficiently pre-processed for encoding.

The system 500 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 508 may be provided to the inverse transform and quantizer 512 to generate the same reference or reconstructed blocks, frames, or other units as would be generated at a decoder such as decoder 530. Thus, the prediction unit 516 may use the inverse transform and quantizer 512, adder 514, and filter 518 to reconstruct the frames.

The prediction unit 516 may perform inter-prediction including motion estimation and motion compensation, intra-prediction according to the description herein, and/or a combined inter-intra prediction. The prediction unit 516 may select the best prediction mode (including intra-modes) for a particular block, typically based on bit-cost and other factors. The prediction unit 516 may select an intra-prediction and/or inter-prediction mode when multiple such modes of each may be available. The prediction output of the prediction unit 516 in the form of a prediction block may be provided both to the subtractor 506 to generate a residual, and in the decoding loop to the adder 514 to add the prediction to the reconstructed residual from the inverse transform to reconstruct a frame.

The partitioner 504 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AVI coding of an entire I-frame or I-slice, spatial or intra-prediction is used, and in one form, only from data in the frame itself.

In various implementations, the prediction unit 516 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 516 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 516 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 506 from the current block of original image data, and the resulting residual may be partitioned into one or more transform blocks (TUs) so that the transform and quantizer 508 can transform the divided residual data into transform coefficients using discrete cosine transform (DCT) for example. Using the quantization parameter (QP) set by the system 500, the transform and quantizer 508 then uses lossy resampling or quantization on the coefficients. The frames and residuals along with supporting or context data block size and intra displacement vectors and so forth may be entropy encoded by the coder 510 and transmitted to decoders.

In one or more embodiments, a system 500 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 500 may process the bitstream with an entropy decoder 530 to extract the quantized residual coefficients as well as the context data. The system 500 then may use the inverse transform and quantizer 532 to reconstruct the residual pixel data.

The system 500 then may use an adder 534 (along with assemblers not shown) to add the residual to a predicted block. The system 500 also may decode the resulting data using a decoding technique employed depending on the coding mode indicated in syntax of the bitstream, and either a first path including a prediction unit 536 or a second path that includes a filter 538. The prediction unit 536 performs intra-prediction by using reference block sizes and the intra displacement or motion vectors extracted from the bitstream, and previously established at the encoder. The prediction unit 536 may utilize reconstructed frames as well as inter-prediction motion vectors from the bitstream to reconstruct a predicted block. The prediction unit 536 may set the correct prediction mode for each block, where the prediction mode may be extracted and decompressed from the compressed bitstream.

In one or more embodiments, the coded data 522 may include both video and audio data. In this manner, the system 500 may encode and decode both audio and video.

In one or more embodiments, while the coder 510 is generating the coded data 522, the system 500 may generate coding quality metrics indicative of visual quality (e.g., without requiring post-processing of the coded data 522 to assess the visual quality). Assessing the coding quality metrics may allow a control feedback such as BRC (e.g., facilitated by the control 521) to compare the number of bits spent to encode a frame to the coding quality metrics. When one or more coding quality metrics indicate poor quality (e.g., fail to meet a threshold value), such may require re-encoding (e.g., with adjusted parameters). The coding quality metrics indicative of visual quality may include PSNR, SSIM, MS-SSIM, VMAF, and the like. The coding quality metrics may be based on a comparison of coded video to source video. The system 500 may compare a decoded version of the encoded image data to a pre-encoded version of the image data. Using the CUs or MBs of the encoded image data and the pre-encoded version of the image data, the system 500 may generate the coding quality metrics, which may be used as metadata for the corresponding video frames. The system 500 may use the coding quality metrics to adjust encoding parameters, for example, based on a perceived human response to the encoded video. For example, a lower SSIM may indicate more visible artifacts, which may result in less compression in subsequent encoding parameters.

It is understood that the above descriptions are for purposes of illustration and are not meant to be limiting.

Figure 6:
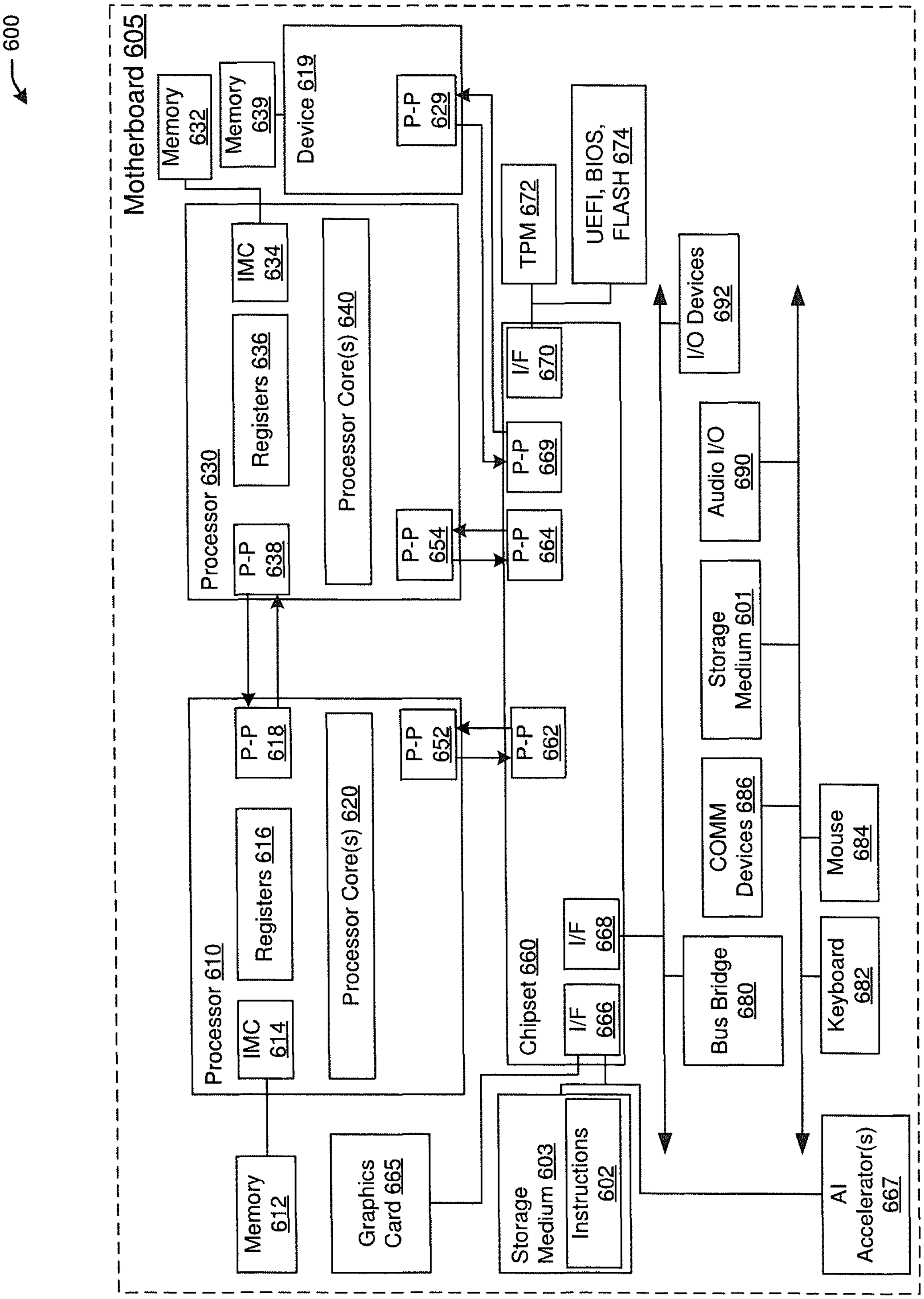
FIG. 6 illustrates an embodiment of an exemplary system, in accordance with one or more example embodiments of the present disclosure.

FIG. 6 illustrates an embodiment of an exemplary system 600, in accordance with one or more example embodiments of the present disclosure.

In various embodiments, the system 600 may comprise or be implemented as part of an electronic device.

In some embodiments, the system 600 may be representative, for example, of a computer system that implements one or more components of FIGS. 1-3E and 5.

The embodiments are not limited in this context. More generally, the system 600 is configured to implement all logic, systems, processes, logic flows, methods, equations, apparatuses, and functionality described herein and with reference to the figures.

The system 600 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 600 may have a single processor with one core or more than one processor. Note that the term "processor" refers to a processor with a single core or a processor package with multiple processor cores.

In at least one embodiment, the computing system 600 is representative of one or more components of FIGS. 1-3E and 5. More generally, the computing system 600 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 600. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard 605 for mounting platform components. The motherboard 605 is a point-to-point (P-P) interconnect platform that includes a processor 610, a processor 630 coupled via a P-P interconnects/interfaces as an Ultra Path Interconnect (UPI), and a device 619. In other embodiments, the system 600 may be of another bus architecture, such as a multi-drop bus. Furthermore, each of processors 610 and 630 may be processor packages with multiple processor cores. As an example, processors 610 and 630 are shown to include processor core(s) 620 and 640, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 610 and the chipset 660. Some platforms may include additional components and some platforms may only include sockets to mount the processors and/or the chipset.

The processors 610 and 630 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 610, and 630.

The processor 610 includes an integrated memory controller (IMC) 614 and P-P interconnects/interfaces 618 and 652. Similarly, the processor 630 includes an IMC 634 and P-P interconnects/interfaces 638 and 654. The IMC's 614 and 634 couple the processors 610 and 630, respectively, to respective memories, a memory 612, and a memory 632. The memories 612 and 632 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 612 and 632 locally attach to the respective processors 610 and 630.

In addition to the processors 610 and 630, the system 600 may include a device 619. The device 619 may be connected to chipset 660 by means of P-P interconnects/interfaces 629 and 669. The device 619 may also be connected to a memory 639. In some embodiments, the device 619 may be connected to at least one of the processors 610 and 630. In other embodiments, the memories 612, 632, and 639 may couple with the processor 610 and 630, and the device 619 via a bus and shared memory hub.

System 600 includes chipset 660 coupled to processors 610 and 630. Furthermore, chipset 660 can be coupled to storage medium 603, for example, via an interface (I/F) 666. The I/F 666 may be, for example, a Peripheral Component Interconnect-enhanced (PCI-e). The processors 610, 630, and the device 619 may access the storage medium 603 through chipset 660.

Storage medium 603 may comprise any non-transitory computer-readable storage medium or machine-readable storage medium, such as an optical, magnetic, or semiconductor storage medium. In various embodiments, storage medium 603 may comprise an article of manufacture. In some embodiments, storage medium 603 may store computer-executable instructions, such as computer-executable instructions 602 to implement one or more of processes or operations described herein, (e.g., process 400 of FIG. 4). The storage medium 603 may store computer-executable instructions for any equations depicted above. The storage medium 603 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 610 couples to a chipset 660 via P-P interconnects/interfaces 652 and 662 and the processor 630 couples to a chipset 660 via P-P interconnects/interfaces 654 and 664. Direct Media Interfaces (DMIs) may couple the P-P interconnects/interfaces 652 and 662 and the P-P interconnects/interfaces 654 and 664, respectively. The DMI may be a high-speed interconnect that facilitates, e.g., eight Giga Transfers per second (GT/s) such as DMI 3.0. In other embodiments, the processors 610 and 630 may interconnect via a bus.

The chipset 660 may comprise a controller hub such as a platform controller hub (PCH). The chipset 660 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 660 may comprise more than one controller hub such as a chipset with a memory controller hub, a graphics controller hub, and an input/output (I/O) controller hub.

In the present embodiment, the chipset 660 couples with a trusted platform module (TPM) 672 and the UEFI, BIOS, Flash component 674 via an interface (I/F) 670. The TPM 672 is a dedicated microcontroller designed to secure hardware by integrating cryptographic keys into devices. The UEFI, BIOS, Flash component 674 may provide pre-boot code.

Furthermore, chipset 660 includes the I/F 666 to couple chipset 660 with a high-performance graphics engine, graphics card 665. The graphics card 665 may implement one or more of processes or operations described herein, (e.g., process 400 of FIG. 4), and may include components of FIGS. 1-3E and 5. In other embodiments, the system 600 may include a flexible display interface (FDI) between the processors 610 and 630 and the chipset 660. The FDI interconnects a graphics processor core in a processor with the chipset 660.

Various I/O devices 692 couple to the bus 681, along with a bus bridge 680 that couples the bus 681 to a second bus 691 and an I/F 668 that connects the bus 681 with the chipset 660. In one embodiment, the second bus 691 may be a low pin count (LPC) bus. Various devices may couple to the second bus 691 including, for example, a keyboard 682, a mouse 684, communication devices 686, a storage medium 601, and an audio I/O 690.

The artificial intelligence (AI) accelerator(s) 667 may be circuitry arranged to perform computations related to AI. The AI accelerator(s) 667 may be connected to storage medium 601 and chipset 660. The AI accelerator(s) 667 may deliver the processing power and energy efficiency needed to enable abundant data computing. The AI accelerator(s) 667 is a class of specialized hardware accelerators or computer systems designed to accelerate artificial intelligence and machine learning applications, including artificial neural networks and machine vision. The AI accelerator(s) 667 may be applicable to algorithms for robotics, internet of things, other data-intensive and/or sensor-driven tasks. In one or more embodiments, the AI accelerator(s) 667 may represent separate hardware—one for the kernel weight prediction neural network 152 and one for the filtering neural network 154 of FIG. 1.

Many of the I/O devices 692, communication devices 686, and the storage medium 601 may reside on the motherboard 605 while the keyboard 682 and the mouse 684 may be add-on peripherals. In other embodiments, some or all the I/O devices 692, communication devices 686, and the storage medium 601 are add-on peripherals and do not reside on the motherboard 605.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:

a first neural network to filter images of a video sequence;

a second neural network to generate kernel weights for the first neural network, the second neural network different from the first neural network, the first neural network and the second neural network to operate on different images of the video sequence in parallel;

machine-readable instructions; and at least one processor circuit to be programmed based on the machine-readable instructions to:

cause the first neural network to generate filtered image data based on a first image of the video sequence and first kernel weights from the second neural network; and cause the second neural network to operate in parallel with the first neural network to generate second kernel weights for the first neural network based on a second image of the video sequence, the second image subsequent to the first image in the video sequence.

2. The system of claim 1, wherein the second neural network includes a plurality of encoders, a plurality of decoders, and a weight predictor, the weight predictor to generate the second kernel weights based on image data decoded by the plurality of decoders.

3. The system of claim 2, wherein the plurality of encoders includes a convolution layer, a parametric rectified linear unit (PReLU) layer, and a pooling layer.

4. The system of claim 2, wherein the plurality of decoders includes an upsampling layer, a convolution layer, and a PReLU layer.

5. The system of claim 2, wherein the weight predictor includes a convolution layer.

6. The system of claim 2, wherein the first neural network includes a first plurality of filtering layers and a second plurality of filtering layers.

7. The system of claim 6, wherein the first plurality of filtering layers includes a convolution layer and an average pooling layer.

8. The system of claim 7, wherein the convolution layer is to accept the first kernel weights and the second kernel weights from the second neural network.

9. The system of claim 6, wherein the second plurality of filtering layers includes a convolution layer and an upsampling layer.

10. The system of claim 9, wherein the convolution layer is to accept the first kernel weights and the second kernel weights from the second neural network.

11. A method comprising:

generating, by a first neural network, filtered image data based on first kernel weights and a first image of a video sequence, the first kernel weights from a second neural network performing kernel weight generation for the first neural network, the second neural network different from the first neural network, the first neural network and the second neural network operating on different images of the video sequence in parallel; and generating, by the second neural network, second kernel weights for the first neural network based on a second image of the video sequence, the second image subsequent to the first image in the video sequence.

12. The method of claim 11, wherein the second neural network includes a plurality of encoders, a plurality of decoders, and a weight predictor, the weight predictor to generate the second kernel weights based on decoded image data from the plurality of decoders.

13. The method of claim 12, wherein the plurality of encoders includes a convolution layer, a parametric rectified linear unit (PReLU) layer, and a pooling layer.

14. The method of claim 12, wherein the plurality of decoders includes an upsampling layer, a convolution layer, and a PReLU layer.

15. The method of claim 12, wherein the weight predictor includes a convolution layer.

16. The method of claim 12, wherein the first neural network includes a first plurality of filtering layers and a second plurality of filtering layers.

17. The method of claim 16, wherein the first plurality of filtering layers includes a convolution layer and an average pooling layer.

18. The method of claim 17, wherein the convolution layer accepts the first kernel weights and the second kernel weights from the second neural network.

19. The method of claim 17, wherein the second plurality of filtering layers includes a convolution layer and an upsampling layer.

20. A device comprising:

a first neural network to filter images of a video sequence;

a second neural network to generate kernel weights for the first neural network, the second neural network having a different architecture than the first neural network, the first neural network and the second neural network to operate on different images of the video sequence in parallel;

machine-readable instructions; and at least one processor circuit to be programmed based on the machine-readable instructions to:

cause the first neural network to generate filtered image data based on a first image of the video sequence and first kernel weights from the second neural network; and cause the second neural network to operate in parallel with the first neural network to generate second kernel weights for the first neural network based on a second image of the video sequence, the second image subsequent to the first image in the video sequence.

* * * * *